United States Patent [19]

Kapich

[11] Patent Number: 5,471,834
[45] Date of Patent: Dec. 5, 1995

[54] ENGINE DRIVEN PROPULSION FAN WITH TURBOCHARGERS IN SERIES

[76] Inventor: Davorin Kapich, 3111 Serrano Dr., Carlsbad, Calif. 92009

[21] Appl. No.: 196,031

[22] Filed: Feb. 14, 1994

[51] Int. Cl.⁶ ................................................. F02K 5/00
[52] U.S. Cl. ................................................. 60/269; 60/612
[58] Field of Search ........................... 60/269, 611, 612

[56] References Cited

U.S. PATENT DOCUMENTS

| | | | |
|---|---|---|---|
| 2,421,518 | 6/1947 | Molloy | 60/269 |
| 3,731,661 | 5/1973 | Hatfield et al. | 60/612 |
| 3,941,104 | 3/1976 | Egli | 60/612 |
| 4,196,593 | 4/1980 | Fraeliger | 60/612 |
| 4,815,282 | 3/1989 | Wilkinson et al. | 60/269 |

FOREIGN PATENT DOCUMENTS 0190516  11/1983  Japan ........................... 60/612

Primary Examiner—Richard A. Bertsch
Assistant Examiner—William Wicker
Attorney, Agent, or Firm—John R. Ross

[57] ABSTRACT

An engine driven propulsion fan. The preferred use of this fan is to power aircraft. Two turbochargers are provided both driven in series by exhaust gasses from a rotary engine. A portion of the compressed air produced by the second turbocharger provides thrust for the engine and a portion is used for engine air, further compressed by the first turbocharger.

3 Claims, 3 Drawing Sheets

ENGINE DRIVEN PROPULSION FAN WITH TURBOCHARGERS IN SERIES

This invention relates to engine driven fans and in particular to engine driven propulsion fans.

BACKGROUND OF THE INVENTION

It is very well known that rotary engines can be used to power aircraft. Mazda Corporation has been producing rotary engines for its automobiles for many years. Many hundreds of thousands of these engines are in use in automobiles. Many of these engines are equipped with turbochargers to provide increased power under certain conditions.

Due to relatively high exhaust gas temperature the exhaust energy of a typical turbocharged aircraft engine is much higher than the energy required to do the turbocharging. This effect becomes more pronounced at higher altitudes, especially with two stage turbocharging, requiring bypass of the exhaust around the turbine to prevent engine overboost and damage to the engine as depicted in FIG. 3. The bypass exhaust, blown through a so called "waste gate valve" 2 in FIG. 3 is being wasted, resulting in relatively high specific fuel consumption. Specific fuel consumption is usually expressed in terms of pounds of burned fuel per horsepower hour.

It is the objective of the present invention to provide a substantial increase in aerodynamic thrust and improvement in the specific fuel consumption by employing an engine which maximizes the use of available exhaust energy.

SUMMARY OF THE INVENTION

The present invention provides an engine driven propulsion fan. The preferred use of this fan is to power aircraft. Two turbochargers are provided both driven in series by exhaust gasses from a rotary engine. A portion of the compressed air produced by the second turbocharger provides thrust for the engine and a portion is used for engine air, further compressed by the first turbocharger.

DETAILED DESCRIPTION OF PREFERRED EMBODIMENTS

First Embodiment

Figure 1:
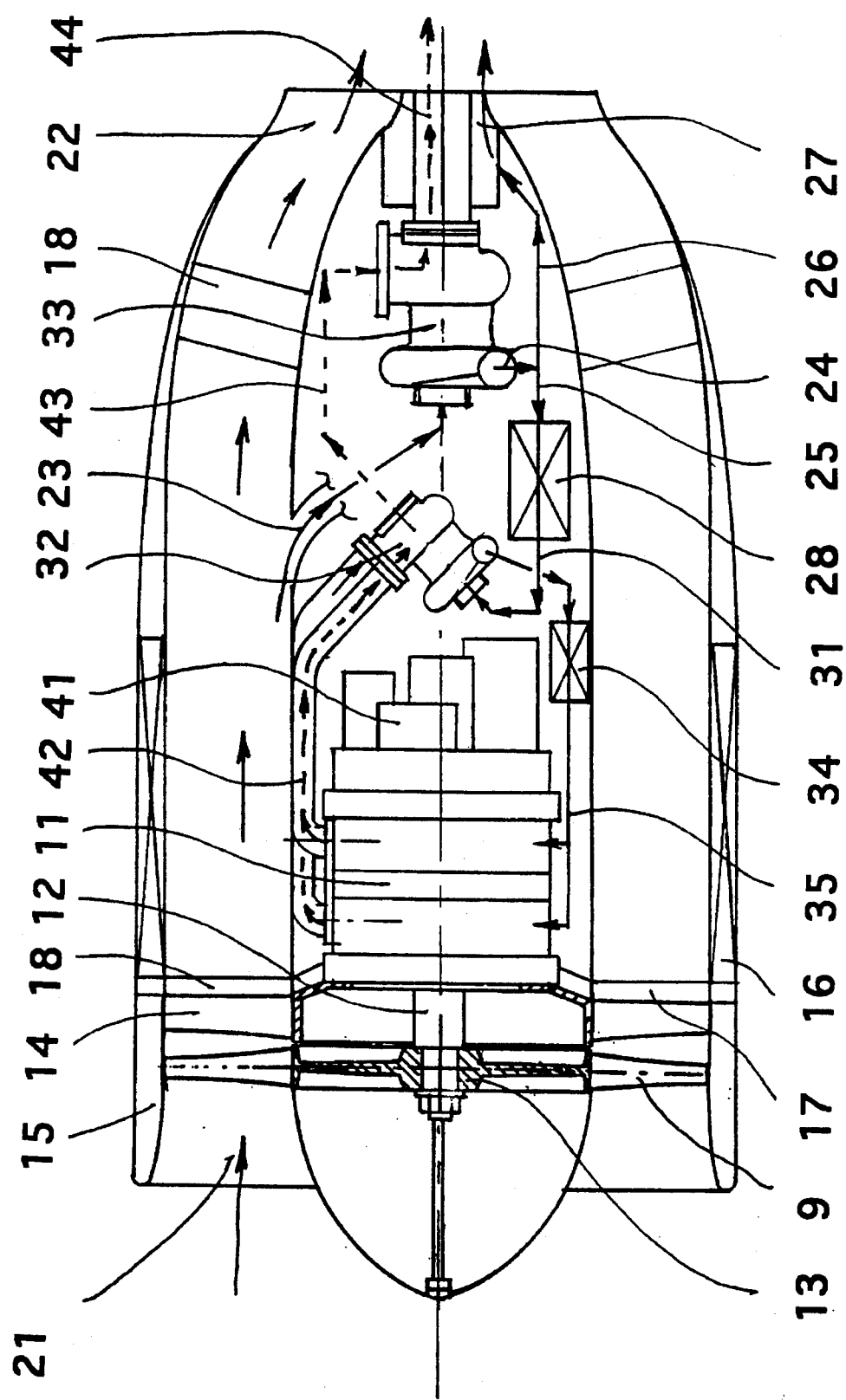
FIG. 1 is a drawing of a first preferred embodiment of the present invention configured as an aircraft engine.

A preferred embodiment of the present invention may be described by reference to FIG. 1. In this embodiment I use a standard Mazda RX7 rotary engine 11. Rotary engine 11 is supported by fan shroud 15 via fan stator vanes 14. Engine shaft 12 drives axial fan wheel 13 to which are attached 10 fan blades 9 which draws air flow through fan inlet 21. A portion of the fan air flow is drawn through air intake passage 23 and further entering compressor section of large turbocharger 33 (which is a standard TV81 series turbocharger) where the air is being compressed and discharged through compressor exit line 24. Air leaving line 24 divides into a smaller portion of the flow entering line 25 and a larger portion of the flow entering line 26 continuing further into compound nozzle 27 where it is expanded creating additional thrust to the main fan flow being expanded through main nozzle 22.

The air flow entering line 25 passes through air aftercooler 28 where the heat of the compression from the large turbocharger 33 is partially removed. This air flow is drawn into the compressor section of the small turbocharger 32 via line 31 and is compressed again and discharged into the second aftercooler 34 and further on into rotary engine 11. Following the usual combustion process inside rotary engine 11 the exhaust gasses are discharged via exhaust pipes 42 into the turbine section of the small turbocharger 32 (which is a standard TO4B series turbocharger) where it expands and provides for the compression work in a conventional manner. Discharge from the small turbocharger 32 turbine flows via line 43 into the turbine section of the large turbocharger 33 where it expands further and provides for the compression work in the conventional manner. The exhaust from the large turbocharger 33 exhaust through pipe 44 adding additional thrust to the overall thrust.

Rotary engine 11 is liquid cooled by radiator 16 via inlet passage 17 and return passage 18. Hydraulic and electric accessories 41 are driven by rotary engine 11 in a conventional manner. Fan blades are designed in accordance with NACA 65 series air foil mounted in accordance with standard design practice. The exact number of stator blades and fans is not critical. I prefer 11 stator blades and 10 fan blades.

The RX7 Mazda engine is commercially available as a replacement part and for other users at Mazda dealers across the country. Turbochargers TV81 and TO4B are standard commercial turbochargers, all commercially available through regular suppliers.

The RX7 engine directly drives an axial flow fan blades 9 providing an airflow rate of 64 lb/sec with a static thrust of 716 lbs at take off and 51 lb/sec air flow rate with a thrust of 237 lbs at 26,000 feet altitude and an air speed of 300 knots.

Additional thrust is provided by the air flow from the TV81 compressor which is driven by an exhaust driven compound turbine. At sea level this thrust is 58 lbs, increasing the takeoff thrust to 774 lbs, i.e., about 8 percent. At 26,000 feet altitude the compound thrust is 60 lbs increasing the total thrust from 237 lbs to 297 lbs, i.e., about 25 percent.

The engine power at takeoff is 330 hp and compound turbine power is 61 hp, i.e. 18 percent of engine shaft power. At 26,000 feet altitude the engine power is 300 hp and compound turbine power is 127 hp, i.e. 42 percent of the engine power. Due to approximately ⅓ air flow being used for combustion air, the net power for the compound propulsion is ⅔, i.e., 40 HP at sea level and 84.7 HP at 26,000 feet.

The specific fuel consumption in terms of lb/hp hr improves approximately inversely to total power, i.e. by 12.3 and 28.2 percent, respectively. On that basis, the combined specific fuel consumption of the system is estimated to be 0.354 lb/hp hr at sea level and 0.333 lb/hp hr at 26,000 feet altitude and speed of 300 knots.

Bypass Control

Figure 3:
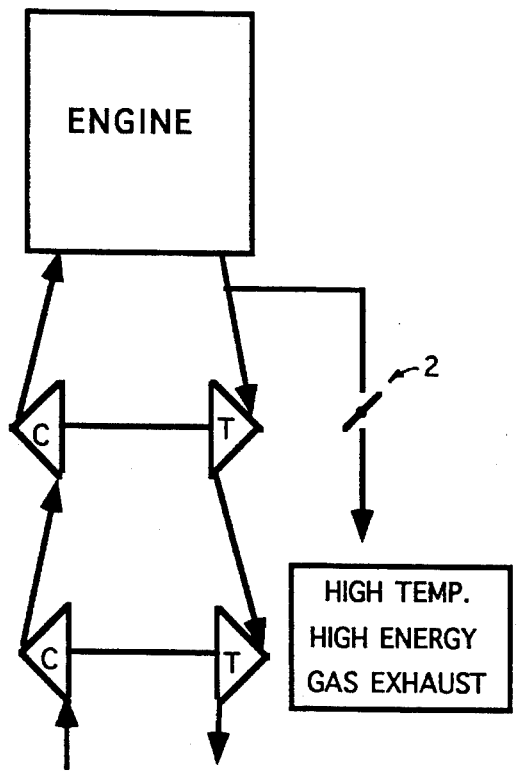
FIGS. 3 and 4 compare features of a prior art configuration and the present invention.
Figure 4:
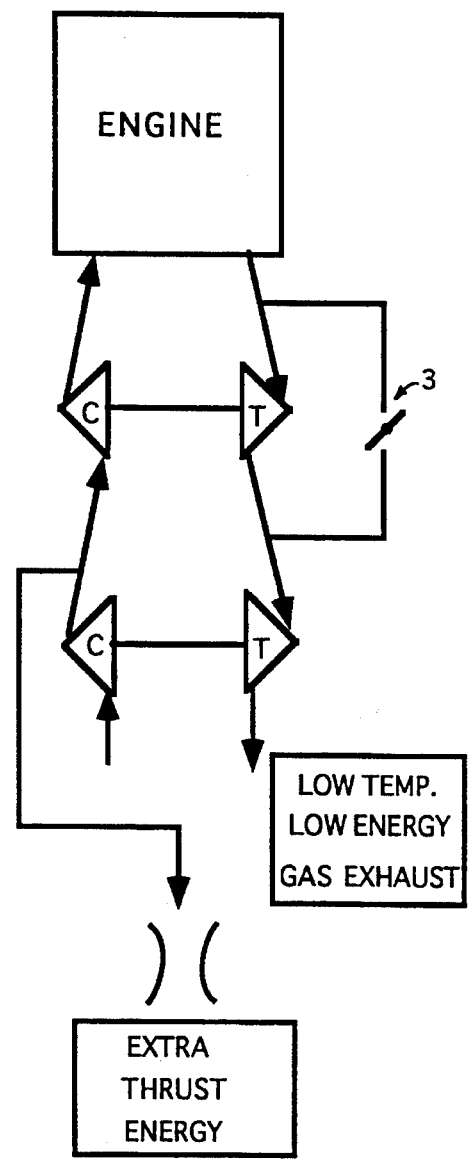

FIG. 4 is a gas flow diagram showing the flow path of both the engine exhaust and the compressed air flow from the two turbochargers. This drawing shows a bypass valve 3 which preferably is installed in the inlet line to the turbine section of turbocharger 32 shown in FIGS. 1 and 2. This valve is opened to prevent overboost of the engine. The bypassed gasses provide extra boost to the second turbocharger which provides extra thrust from the engine by reason of increased velocity of air expanding out the exhaust nozzle of the propulsion fan. A graphical comparison of the present invention to the prior art can be seen by reference to FIGS. 3 and 4. Prior art devices waste a large portion of the exhaust gas energy by dumping it at high temperature as shown in FIG. 3, whereas the present invention gets much better utilization that energy by extracting more of the heat energy in the second turbocharger and using that energy to provide additional compressed air thrust.

Figure 2:
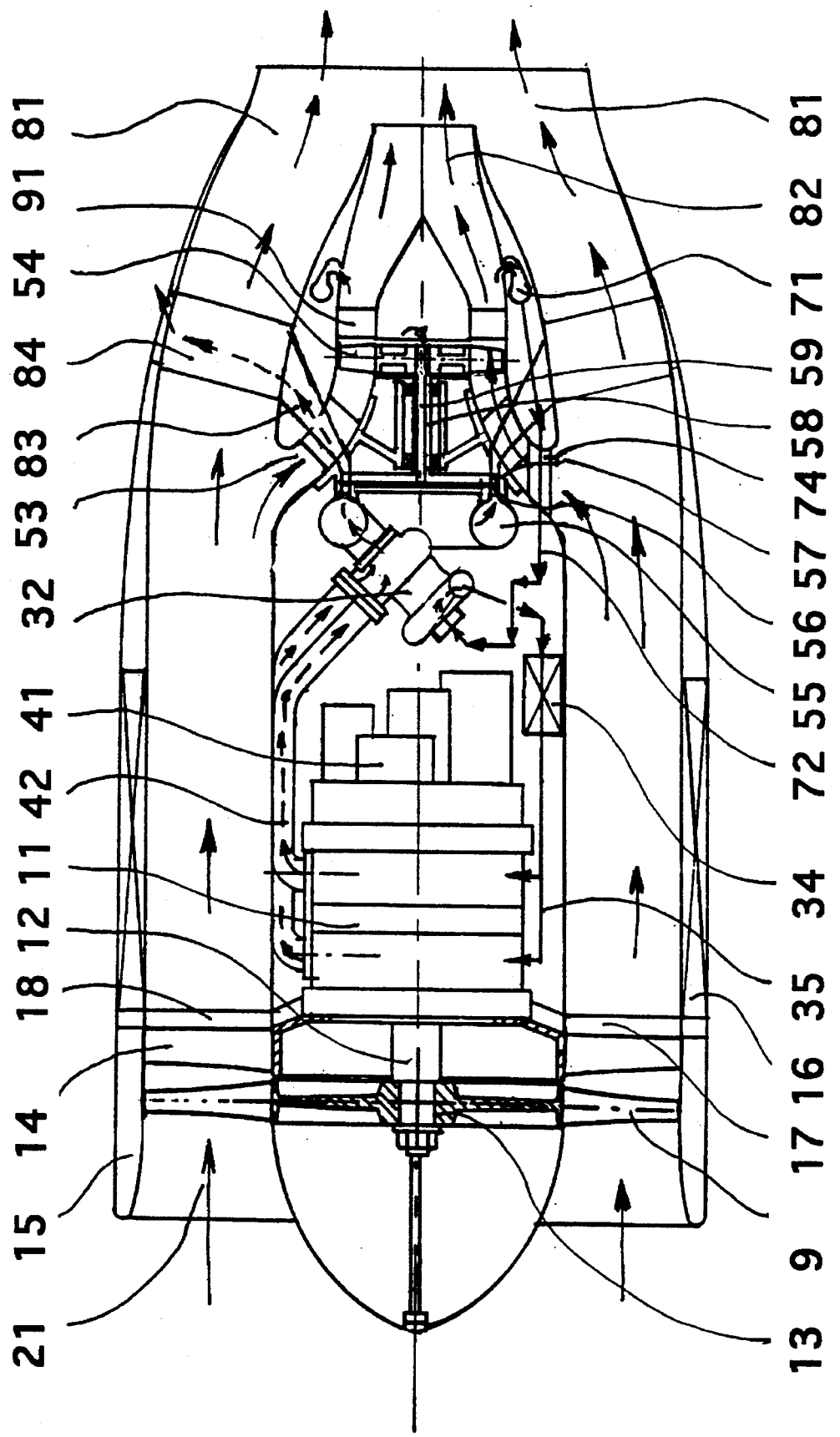
FIG. 2 is a drawing of a second preferred embodiment of the present invention configured as an aircraft engine.

In both FIG. 1 and FIG. 2 exhaust gasses flow is shown by dashed arrows. Compressed air flow is shown by solid arrows.

Second Embodiment

A second preferred embodiment is shown in FIG. 2. In the embodiment shown in FIG. 1 the air flow from the large turbocharger 35 is split approximately ⅓ and ⅔ into lines 25 and 26 respectively. For some aircraft applications where a split of about 10 percent and 90 percent respectively to lines 25 and 26 is desired, a standard large turbocharger shown as 33 on FIG. 1 are not available.

In such case a special axial flow turbine driven axial flow fan is preferred, but such fans are not commercially available. The design and function of such an axial flow turbocharger is shown in FIG. 2. The turbine for this turbocharger is an axial flow turbine. Exhaust from turbocharger 32 discharges into volute 55 and then flows axially through 36 nozzles (not shown) through stator vanes 56 and 180 axial turbine blades 57 to drive shaft 58 and compressor blades 54.

The basic engine and fan concept remains the same as shown in FIG. 1. As shown in FIG. 2, the air flow to compound fan 54 enters via compound fan inlet 53 and exits through a series of compound fan stator vanes 91 into the compound fan expansion nozzle 82 which discharges concentrically into main fan expansion nozzle 81.

Approximately 10 percent to 20 percent of the air flow exiting the compound fan stator vanes 91 is rammed into the engine air intake collector 71 while the remaining portion of the air flow is expanded through compound fan expansion nozzle 82. The engine air flows from intake collector 71 further via line 72 into turbocharger 32. One or more aerodynamic struts 74 are utilized to house line 72 to cross over the compound fan inlet 53. The engine air flow continues as described for the unit in FIG. 1 further through after cooler 34, engine 11 and turbine section of the turbocharger 32 which discharges into the compound turbine inlet volute 55. The exhaust gasses are expanded further through axial turbine stator vanes 56 and axial turbine rotor blades 57 and flow further via one or more discharge passages 83 and 84 into the atmosphere. Aerodynamic crossover struts house discharge passages 83 and 84 to minimize aerodynamic obstruction in the compound fan and the main fan flows.

In order to minimize the material temperature requirements and cost of axial turbine rotor blades 57 and associated turbine wheel, turbine shaft 58 attached to the turbine wheel carrying axial turbine rotor blades 57 is air cooled with a relatively small portion of the air flow flowing through shaft hole 59 from the higher pressure downstream of compound fan 54 to the lower pressure downstream of axial turbine stator vanes 56 and axial turbine rotor blades 57, mixing with exhaust gasses and exiting into the atmosphere.

It should be understood that the specific form of the invention illustrated and described herein is intended to be representative only, as certain changes may be made therein without departing from the clear teachings of the disclosure. For example, a single stage compound fan can be constructed as a two or more axial stage fan, depending of the specific aircraft engine and thrust and altitude requirements. Turbine exhausts can be modified to discharge into the main fan nozzle 81. Accordingly, reference should be made to the followings appended claims in determining the full scope of the invention.

I claim:

1. An engine driven propulsion fan system comprising:
   a) a rotary Wankel engine defining an engine shaft and an exhaust for exhausting exhaust gasses,
   b) a propulsion fan exhaust nozzle,
   c) a fan wheel attached to said engine shaft,
   d) a plurality of fan blade means attached to said fan wheel defining a propulsion fan and arranged to receive and further compress ram air, said ram air defining stage 1 compressed air, and to provide propulsion compressed air for propulsion and compressed air for combustion, said compressed air for combustion defining stage 2 compressed air,
   d) a first turbocharger means for producing stage 4 compressed air for combustion, said first turbocharger means being driven by exhaust gasses from said engine and defining a first turbocharger compressed air inlet,
   e) a second turbocharger means for producing stage 3 compressed air by further compressing stage 2 compressed air, said second turbocharger means being driven by exhaust gasses exhausted by said first turbocharger, said stage 3 compressed air being directed as follows:
      a portion of said stage 3 compressed air being directed to the propulsion fan exhaust nozzle to provide propulsion and
      a portion of said stage 3 compressed air being directed to said first turbocharger compressed air inlet.

2. An engine driven propulsion fan as in claim 1 said second turbocharger means is an axial flow turbocharger having a shaft with an axis defining an axial direction and defining a plurality of turbine blades arranged such that said exhaust gasses exit said turbine blades in essentially said axial direction.

3. An engine driven propulsion fan as in claim 1 and further comprising a bypass valve means for bypassing a portion of said exhaust around said first turbocharger and into said second turbocharger.

* * * * *